United States Patent [19]

Logan

[11] 4,416,346
[45] Nov. 22, 1983

[54] EXTENSIBLE STEERING, PROPULSION AND SKIRTING MEANS FOR GROUND EFFECT VEHICLES

[76] Inventor: Russell J. Logan, 2301 S. Millbend, Apt. 1007, The Woodlands, Tex. 77380

[21] Appl. No.: 220,505

[22] Filed: Dec. 29, 1980

[51] Int. Cl.³ .............................................. B60V 1/16
[52] U.S. Cl. .................................... 180/119; 180/127
[58] Field of Search ........................ 180/119, 126, 127

[56] References Cited

U.S. PATENT DOCUMENTS

| | | | |
|---|---|---|---|
| 3,173,510 | 3/1965 | Smith | 180/119 |
| 3,216,518 | 11/1965 | Beardsley | 180/119 |
| 3,237,708 | 3/1966 | Strasser et al. | 180/127 |
| 3,251,595 | 5/1966 | Morgan et al. | 272/1 |
| 3,292,721 | 12/1966 | Dobson | 180/7 |
| 3,367,658 | 2/1968 | Bayha | 273/86 |
| 3,371,738 | 3/1968 | Bertin | 180/119 |
| 3,390,736 | 7/1968 | Thomas | 180/119 |
| 3,416,626 | 12/1968 | Nagamatsu | 180/124 |
| 3,586,118 | 6/1971 | Bertin | 180/119 |
| 3,605,937 | 9/1971 | Kirwan | 180/120 |
| 3,669,212 | 6/1972 | Desbarats | 180/120 |
| 3,709,318 | 1/1973 | Ferguson | 180/127 |
| 3,804,197 | 4/1974 | Grignon et al. | 180/127 |
| 3,893,538 | 7/1975 | Thompson et al. | 180/119 |
| 3,896,735 | 7/1975 | Fischer | 104/23 |
| 3,964,698 | 6/1976 | Earl | 244/100 |
| 4,063,611 | 12/1977 | Anderson | 180/119 |
| 4,190,129 | 2/1980 | Mary | 180/119 |
| 4,193,470 | 3/1980 | Logan | 180/117 |

FOREIGN PATENT DOCUMENTS

| | | | |
|---|---|---|---|
| 1444874 | 5/1966 | France | 180/119 |
| 1236101 | 6/1971 | United Kingdom | 180/119 |
| 1465382 | 2/1977 | United Kingdom | 180/119 |
| 1499317 | 2/1978 | United Kingdom | 180/119 |

Primary Examiner—Joseph F. Peters, Jr.
Assistant Examiner—Ross Weaver
Attorney, Agent, or Firm—Pravel, Gambrell, Hewitt, Kirk & Kimball

[57] ABSTRACT

A new improved steering, propelling and skirting means is provided for air cushion type vehicles. The steering, propelling or skirting means is biased to maintain contact with the underlying support surface thereby providing dramatic improvements in the response for steering and propelling the vehicle, as well as reduction in fluid loss with respect to the vehicle skirting means.

1 Claim, 8 Drawing Figures

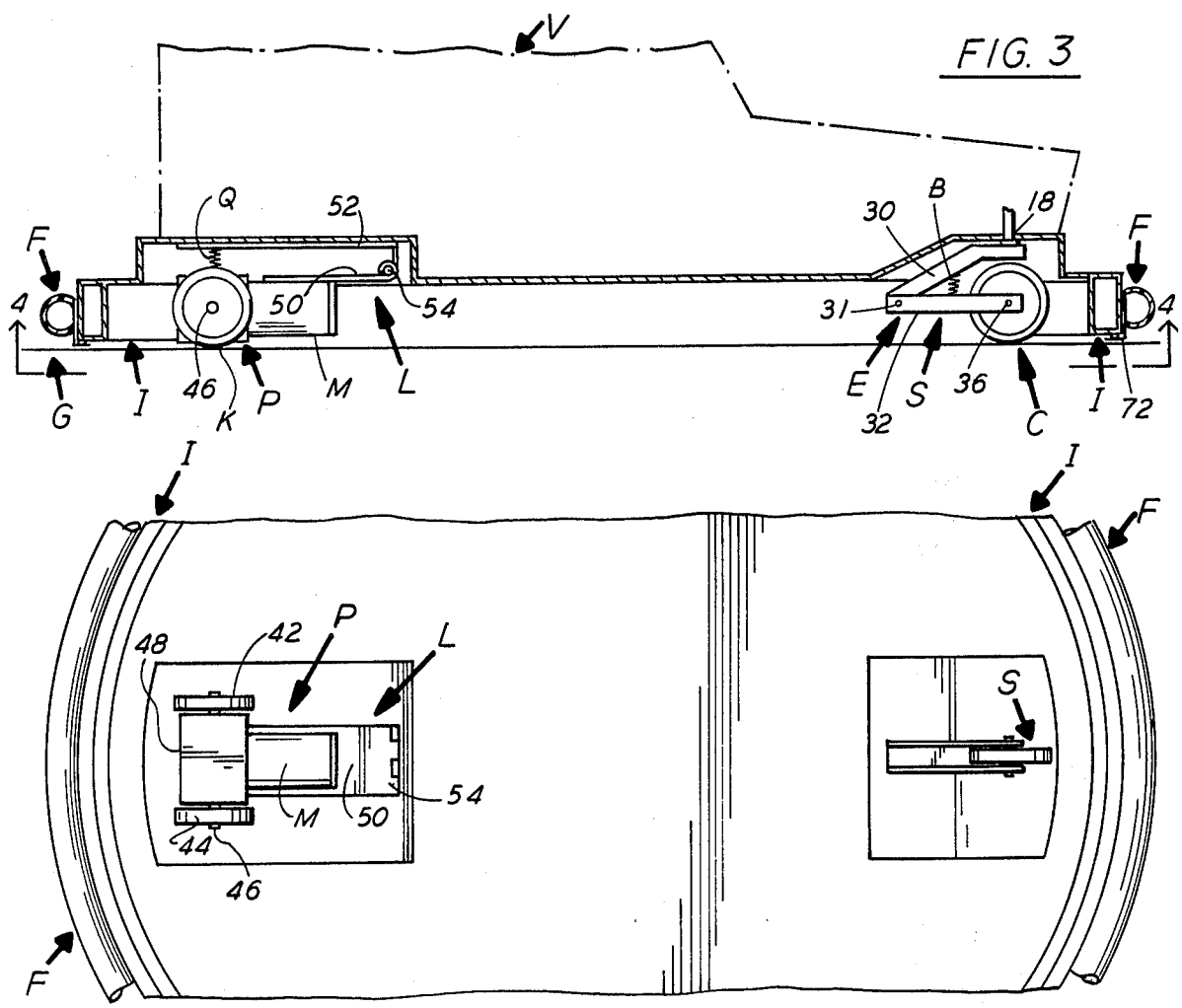
FIG. 3
FIG. 4
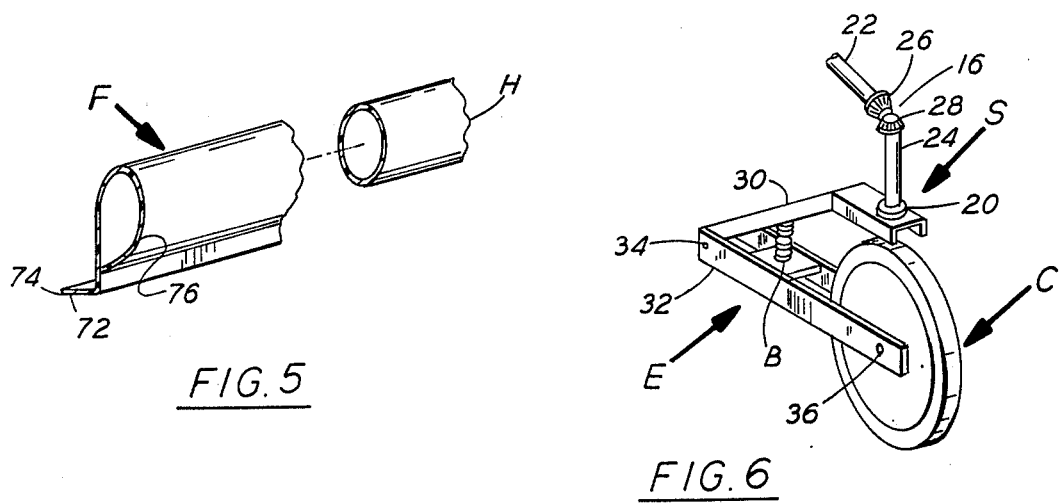
FIG. 5
FIG. 6

EXTENSIBLE STEERING, PROPULSION AND SKIRTING MEANS FOR GROUND EFFECT VEHICLES

BACKGROUND OF THE INVENTION

1. Field of Invention

The present invention relates to steering, propulsion and skirting means for ground effect vehicles or hovercraft.

2. Description of Prior Art

U.S. Pat. Nos. 3,896,735; 3,367,658; 3,251,595; 3,669,212; 3,605,937; 3,292,721; and U.S. Pat. No. 4,193,470 of which applicant is inventor, relate to what are known as ground effect vehicles.

In U.S. Pat. No. 3,896,735, an external propeller blade propels the vehicle which is steered and guided over a fixed course by a fixed railway. In U.S. Pat. No. 3,367,658 a fluid discharge port propels the vehicle, which is supported on the surface by wheels, but which is again steered by riding over a fixed course by track assembly. In U.S. Pat. No. 3,251,595 steering and propulsion are effected via controlled fluid discharge jets, while in both U.S. Pat. No. 3,669,212 and U.S. Pat. No. 3,605,937 movable vanes positioned to deflect the air discharged by the propulsion means are used as the method of steering the vehicle. Likewise, in my prior U.S. Pat. No. 4,193,470, fluid discharge propulsion and movable vane fluid deflection are used as steering methods.

In U.S. Pat. Nos. 3,416,626 and 3,964,698 methods of providing suitable support chambers or undercarriages for ground effect vehicles are discussed. In U.S. Pat. No. 3,416,626 a flexible disphragm with a central opening which discharges pressurized fluid is used, while U.S. Pat. No. 3,964,698 inflatable cells which employ air escape openings at the point of alleviate excess wear on the skirts are used.

As far as is known, steering and propulsion in ground effect vehicles has always been accomplished by directing pressurized fluid (usually air) in one manner or another. The result of the application of this type of steering and propulsion means (either rudders, vanes, or directable air jets) is a very slow, sluggish response, making the application of ground effect vehicles to uses which require precise handling characteristics impractical. Further, known skirting methods typically employ an inflatable rubber (or similar material) cell which forms or completes an air capture chamber. While this method provides a suitable result over a variety of surfaces, it results in a high loss of pressurized fluid over smooth solid surfaces such as a floor.

SUMMARY OF THE INVENTION

Briefly, the present invention provides new and improved steering, propelling and skirting of ground effect vehicles which typically employ the use of pressurized fluid (usually air), which is captured in a support chamber under the vehicle to lift the vehicle above a support surface. The present invention is applicable to vehicles of this type regardless of whether the fluid is directed upward from the support surface toward the vehicle or downward from the vehicle toward the support surface.

These new means all employ an extensible member which maintains contact with the support surfaces over which the vehicle hovers. In the case of the steering means, a contant member which may be a wheel is connected to the vehicle by an extensible support means and is kept in contact with the support surface by a spring effect biasing means. In the case of the propulsion means, a driven contact member, which may be a wheel, is connected to the vehicle by an extensible support means and is kept in contact with the support surface by a spring effect biasing means. In the skirt, a flexible flap positioned under the vehicle at rest is forced downward and outward as the vehicle rises in response to the lift provided by the pressurized fluid in the lift chamber. This action allows the flap to maintain contact with the support along a uniform edge, greatly improving the pressure loss characteristics of ground effect vehicles when operating over smooth surfaces.

BRIEF DESCRIPTION OF THE DRAWINGS

FIG. 3 is a side elevation of a ground effect vehicle in partial cross-section, showing propulsion, steering and skirting means according to the present invention.

FIG. 4 is a partial bottom plan view of the vehicle of FIG. 3.

FIG. 5 is a exploded, isometric view of a portion of skirting means according to the present invention.

FIG. 6 is an isometric view of steering means according to the present invention.

DESCRIPTION OF THE PREFERRED EMBODIMENT

Figure 1:
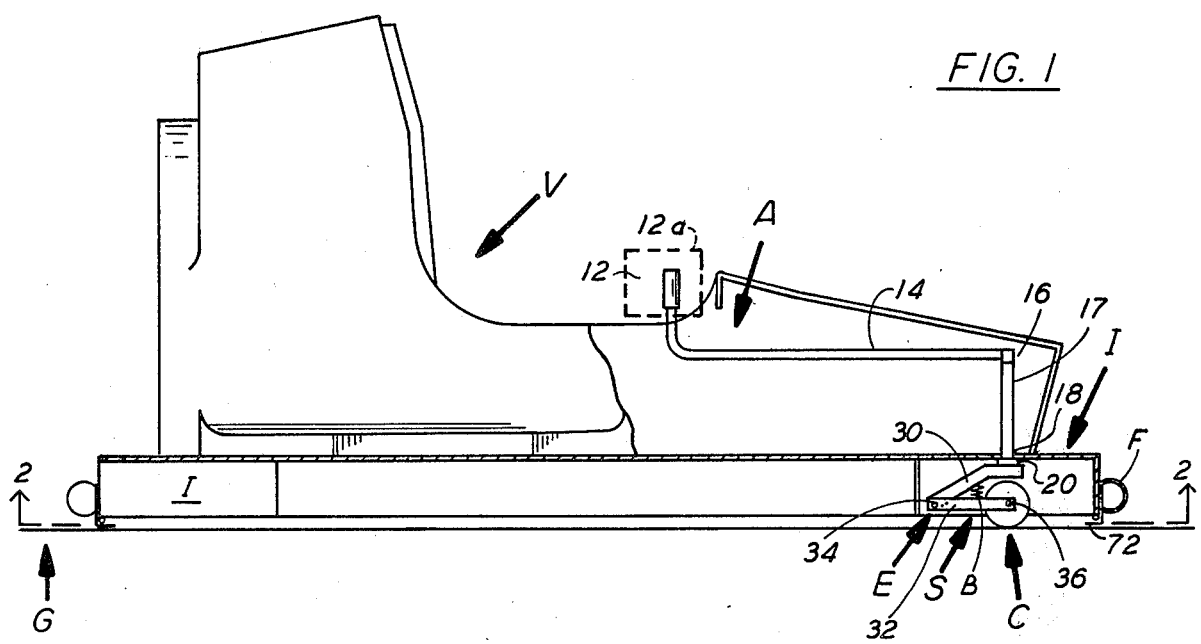
FIG. 1 is a side elevation of a ground effect vehicle, partially in cross-section, with steering means and skirt means according to the present invention.
Figure 2:
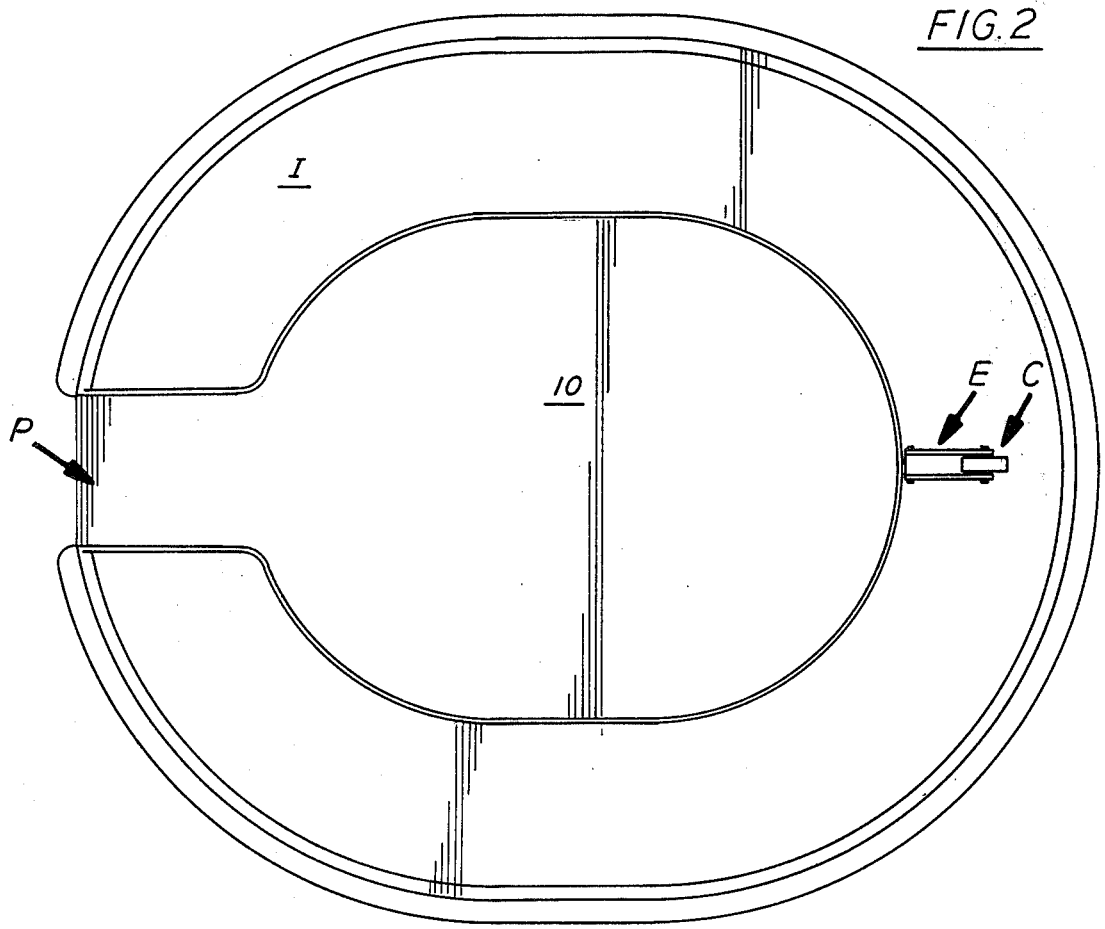
FIG. 2 is a bottom plan view of the ground effect vehicle of FIG. 1.

In the drawings, the letter V designates a ground effect vehicle or hover craft of the type which employ the use of pressurized fluid (usually air or some gas) to provide lift to the vehicle, and which hover above a support surface, designated by the letter G. These vehicles typically employ a skirting means I to form a fluid chamber 10 under the vehicle V which captures and retains the pressurized fluid thereby lifting the vehicle above the support surface G, as well as a steering means S to steer the vehicle, and a propulsion means P to propel the vehicle over the support surface G. In the present invention, a resilient flap skirt member F is provided to improve the pressure-loss characteristics of the skirt I.

Considering the steering means S in greater detail (FIGS. 1 and 6), a control member A receives a steering order either manual or remote from above the vehicle and transmits the order to a contact member C to steer the vehicle. An extensible support means E connects the control member A to the contact member C through the undercarriage of the vehicle so as to allow rotation of and support for the steering assembly S. A biasing element B maintains contact between the contact member C and the support surface G.

The control means A comprises a control member 12 for receiving a steering order which may be a handle (shown in FIG. 1) or steering wheel for manual control by a passenger for the vehicle V, or a radio frequency receiver with electromechanical servo mechanism 12a for remote control (shown in phantom FIG. 1). A linkage rod or control arm 14 transmits the steering order from control member 12 to the contact member C through a jet 16 and rod 17. The rod 17 is pivotally mounted to the undercarriage of the vehicle V at mount 18. The rod 17 is connected at a lower end by a connection 20 to extensible support means E.

An alternative embodiment for use in conjunction with a steering wheel as control member 12 is shown in FIG. 6 and comprises separate control arms 22 and 24 joined at joint 16 by mated pinion gears 26 and 28. The arm 22 is connected to the linkage 14 and noves in response thereto. The gears 26 and 28 translate rotation of arm 22 to corresponding rotation of arm 24 to steer the vehicle through the contact member C.

The extensible support means E, as shown in FIGS. 1 and 6, is comprised of two independent support arms 30 and 32, which are pivotally connected at 34 by use of a lag-bolt and nut or other suitable means. The extensible support means E may also comprise one or more telescoping tube assemblies connecting the contact member C to the control means A.

The biasing means B exerts a constant force between arms 30 and 32, thereby maintaining contact between the contact member C and the support surface G. (FIG. 1) The biasing means B as shown in FIG. 1 is a coil spring positioned between the arms 30 and 32 and is fixedly secured to each arm by welding or by any other suitable means. The biasing means B may also be one or more fluid operated cylinders as shown as $B_1$ in FIG. 7.

The contact member C as shown in all the drawings may be a freely rotatable wheel, axially mounted to the extensible support means E with a simple axle and ball bearing assembly 36. Any other manner of mounting which would allow free rotation would suffice however. The contact member C can be a rotatable wheel as shown, for operation over any surface, but especially well adapted for operation over water, land or man-made surfaces, or it could be formed in other shapes for optimum steering control over other particular surfaces. Such adaptations could be a rudder for fluent surfaces, a ski for granular surfaces such as snow or sand, or a flexible ribbed rotational track assembly for rough terrain.

Figure 7:
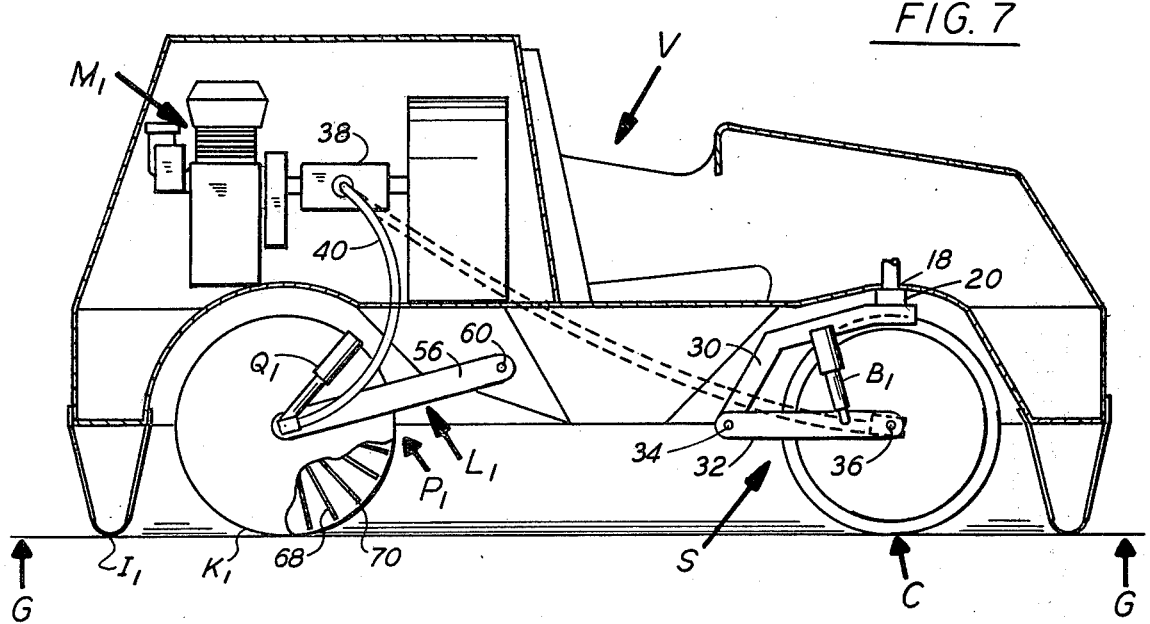
FIG. 7 is a side elemation of a ground effect vehicle with alternative embodiments of steering and propulsion means according to the present invention.

The steering means as shown in FIG. 1 is located just inside the skirting means I. When an inflatable or other skirt means is used which does not allow similar location, the steering means S may be located in any manner such that contact with the support surface may be maintained. The location of the contact member C near the front or rear of the vehicle is desirable to achieve maximum steering response. The steering means S may also be configured so as to provide propulsion to the vehicle either singularly or acting in conjunction with some other propulsion means. This is accomplished by driving the contact member C with an appropriate driving means such as an electric motor or combustion engine coupled with appropriate gear reduction and cable, direct drive linkage, or any other suitable means. In adapting the steering means in such a manner, the ability of the steering means to extend to maintain contact with the surface must not be hindered. Such a configuration is shown in FIG. 7, where a combustion engine M, is connected through a reduction gear 38 and drive cable 40 to a propulsion wheel $K_1$. This same configuration is used to drive the contact member C by connecting a cable drive similar to 38 in FIG. 7 from the motor M to the contact member C.

Examining the propulsion means in greater detail, in FIG. 3, the letter P designates the propulsion means including a motor M, a contact means K, a biasing means Q and a support means L. It is preferred that the contact means K be comprised of at least two drivable contact members 42 and 44 which will usually be wheels and are axially mounted at 46 to a gear reduction assembly 48 (FIG. 4). The motor M is a conventional electrical motor, deriving power from either a self-contained or external power supply. In this embodiment, the motor M and contact member K are mounted on the support means L by welding or bolting the arm 50 to the motor housing (FIG. 3). Arms 50 and 52 are pivotally connected at joint 54 and arm 52 is fixedly secured to the vehicle V by welding or other suitable means. The biasing member Q is one or more coil springs mounted by welding or other suitable means between arm 52 and the reduction box 48.

Figure 8:
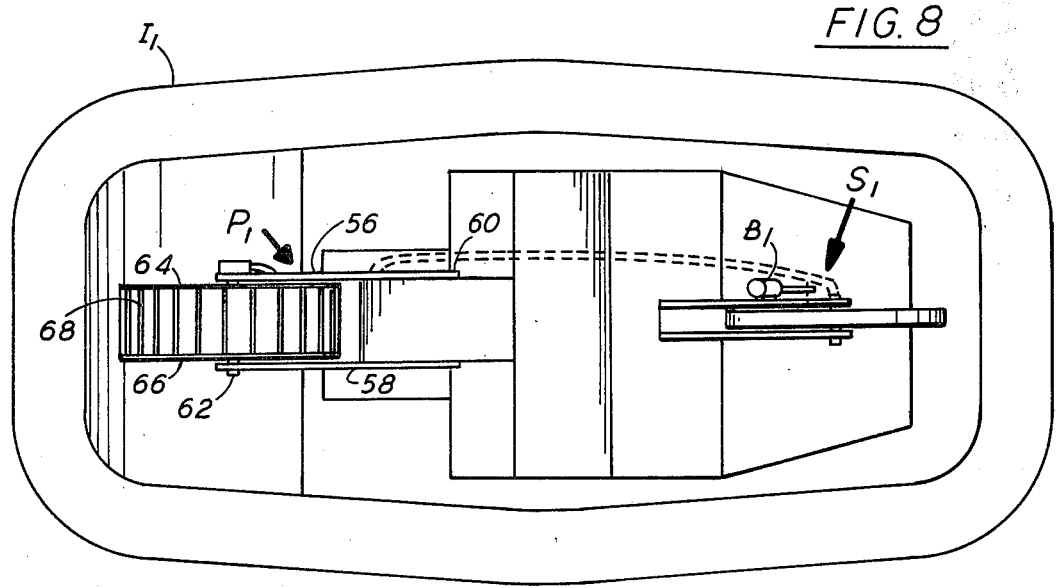
FIG. 8 is a bottom plan view of the vehicle in FIG. 7.

An alternative propulsion means is shown in FIG. 7 and 8, and designated by the letter $P_1$. This alternative embodiment includes the internal combustion engine $M_1$, an extensible support means $L_1$, a driven contact member $K_1$ and a biasing means $Q_1$. The biasing means $Q_1$ is a pair of telescoping fluid operated cylinders which exert constant force on the contact member $K_1$ to maintain contact between it and the support surface G. The extentsible support means $L_1$ is comprised of arms 56 and 58 pivotally mounted to the vehicle V at 60, and axially connected to the contact member $K_1$ with an axle and bearing assembly 62. Further in FIG. 8, the contact member $K_1$ is shown as a paddle wheel assembly comprised of outer disks 64 and 66 and inner vanes 68. the vanes 68 are radially oriented, equally angularly spaced, and extend from the inner axle of the contact member $K_1$ to a point 70 inside the outer periphery of the discs 64 and 66. In this manner the discs make contact with solid support surfaces thereby propelling the vehicle while the vanes propel the vehicle over fluent surfaces by providing a paddle wheel action. This allows the vehicle to make a transition from fluent support surface to solid support surface without change of contact member $K_1$. The contact member K in FIG. 3, and $K_1$ in FIG. 7 may also comprise a flexible ribbed track assembly which is especially suitable for traversing rough terrain. This assembly consists of a plurality of hingedly connected track plates engaging and looping around two or more driving wheels, similar to the type of assembly typically used in conjunction with commercial bulldozers or military vehicles.

In FIG. 7, where the power from motor $M_1$ is delivered to the contact member via a reduction box 38 and drive cable 40, a direct drive gear assembly or pulley and belt assembly would also suffice.

The propulsion means $P_1$ may also serve as a steering means. This is accomplished by mounting the contact member $K_1$ (FIG. 7) with an extensible support means similar to that used to mount contact member $C_1$ also in FIG. 7, thereby allowing the driven contact member $K_1$ to pivot in response to steering force applied by a control means A, thereby steering the vehicle V.

Another aspect of the present invention is the skirt means designated by the letter in FIGS. 1 through 5. As is shown in FIG. 3 and 4, the skirt F is attached to the outer periphery of the non-inflatable skirt I. A resilient flap member 72 (FIG. 5), folds under the non-inflatable skirt member I (FIG. 1) when the vehicle V is resting upon the support surface G. As the vehicle V rises above the surface G, the flap 72 resiliently responds to the fluid pressure under the vehicle V and pivots downward and outward thereby maintaining contact with the support surface along the edge 74 shown in FIG. 5. In this manner an improved seal is maintained, and a dramatic reduction in the loss of fluid pressure from the support chamber 10 (FIG. 2) is achieved. This effect is especially important, when the vehicle V is operated over a substantially smooth, hard support surface, since the seal over such a surface is excellent, and consequently, a significant reduction of the volume of pressurized fluid needed to operate the vehicle V is achieved.

The skirting means F may be attached to the vehicle by any conventional means, however the preferred method is illustrated in FIGS. 3 and 5. In this embodiment, an inflatable, flexible hose H of suitable size and length, is inserted in the skirt loop 76. The skirt means F is then placed around the periphery of the non-inflatable skirt I, as illustrated in FIG. 4. The skirt means F is secured to the vehicle V by inflating the hose H, thereby binding the skirt means F between the skirt I and the hose H. This configuration allows a rapid, convention procedure for replacing the skirting means F.

It should be understood that numerous modifications to the foregoing embodiments of the steering means S, the propulsion means P, and the skirting means F may be made. Examples of the types of modifications are illustrated in FIG. 7 as $P_1$ and $S_1$, and have been previously explained. In use of the present invention, the steering means S and propulsion means P maintain direct contact with the support surface, thereby providing significantly improved steering and propulsion response. The skirting means F, resiliently responds to the pressurized fluid under the vehicle and maintains a seal along the edge 74 providing substantially improved sealing characteristics over substantially smooth surfaces.

The foregoing disclosure and description of the invention are illustrative and explanatory thereof and various changes in the size, shape and material as well as in the illustrated construction of the preferred embodiment may be made without departing from the spirit of the invention.

I claim:

1. A skirt member for use with ground effect vehicles which employ a chamber for capturing pressurized fluid as a means for providing lift to the vehicle, and which hover above a support surface, comprising a resilient flap attached to and surrounding the outer periphery of the chamber, having a lip member forming a seal between the chamber and the support surface, wherein said flap is attached to said chamber by an attachment means comprising a flexible, inflatable hose which serves as a belt to releasably mount said resilient flap to the periphery of the chamber.

* * * * *